US006940672B2

(12) United States Patent
Stubbs et al.

(10) Patent No.: US 6,940,672 B2
(45) Date of Patent: Sep. 6, 2005

(54) AZIMUTHAL TRANSITION LAYOUT FOR TWO-SIDED DATA STORAGE TAPE

(75) Inventors: Daniel P. Stubbs, Marine on St. Croix, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 27 days.

(21) Appl. No.: 10/744,998

(22) Filed: Dec. 23, 2003

(65) Prior Publication Data

US 2005/0134986 A1 Jun. 23, 2005

(51) Int. Cl.[7] .................................................. G11B 5/02
(52) U.S. Cl. ........................................ 360/55; 360/134
(58) Field of Search ............................... 360/131, 134, 360/55, 60, 90, 124; 428/694 TM, 694 BM; 427/128, 548

(56) References Cited

U.S. PATENT DOCUMENTS 3,725,611 A * 4/1973 Smaller ...................... 360/134
4,363,038 A 12/1982 Fayling
5,850,328 A 12/1998 Leonhardt et al.
2003/0228498 A1 * 12/2003 Bradshaw .............. 428/694 TS

OTHER PUBLICATIONS

"Anisotropic Erasure and Demagnetization Characteristics of Recording Tapes Comprising Particles with Uniarial Magnetocrystalline Anisotropy,"*IEEE Trans. On Mag.*, vol. MAG-13, No. 5, pp. 1391-1393 (Sep. 1977).

* cited by examiner

*Primary Examiner*—Alan T. Faber
(74) *Attorney, Agent, or Firm*—Eric D. Levinson (57) ABSTRACT

In general, the invention provides two-sided magnetic data storage tape comprising azimuthal magnetic transition layouts that can substantially reduce demagnetization of recorded magnetic transitions on the surfaces of the tape. The invention specifically balances the goal of simplified media manufacture with the goal of reducing or avoiding media degradation when the tape is spooled. The two-sided magnetic data storage tape defines a substantially similar easy axis of magnetic anisotropy on a first and a second side of the tape, which can simplify media manufacture. Recorded magnetic transitions on the opposing sides of the tape define azimuths that are substantially different, which can help avoid media degradation when the tape is spooled.

25 Claims, 5 Drawing Sheets

AZIMUTHAL TRANSITION LAYOUT FOR TWO-SIDED DATA STORAGE TAPE

TECHNICAL FIELD

The invention relates to data storage media and, more particularly, to magnetic data storage tape.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. For example, magnetic tape cartridges or large spools of magnetic tape are often used to back up large amounts of data for large computing centers. Magnetic tape cartridges also find application in the backup of data stored on smaller computers such as desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or read data from the tracks. As the number of data tracks increases, the data storage capacity of the magnetic tape likewise increases. However, as the number of data tracks increases, the tracks usually become narrower and more crowded on the surface of the data storage tape. In order to facilitate precise positioning of the read/write heads relative to the data tracks on the magnetic tape, servo techniques have been developed. On magnetic data storage tape, the servo information is often stored in specialized tracks on the medium, called servo tracks.

In some cases, data is written on both a first side and a second side of the magnetic tape to increase the storage capacity. In particular, two-sided magnetic storage tape includes a magnetic material on both the first side and the second side of the tape to allow for recording of data on both sides of the tape. One problem with two sided tape, however, is the possibility of corruption of data when the magnetic tape is spooled, due to the proximity of the second side to the first side on the tape spool. In other words, magnetic interaction between the first and second sides can occur when the sides come into contact on a tape spool. In order to avoid such data corruption, techniques have been used in which the magnetic coatings on opposing sides of a two-sided data storage tape have different easy axes of magnetic anisotropy. Creating coatings for the opposing sides of a data storage tape to have different easy axes of magnetic anisotropy, however, can significantly complicate the fabrication of two-sided tape, and may increase manufacturing costs.

SUMMARY

In general, the invention provides two-sided magnetic data storage tape comprising azimuthal transition layouts that can reduce demagnetization effects. The two-sided magnetic data storage tape defines a substantially similar easy axis of magnetic anisotropy on a first and a second side of the tape. Substantially similar magnetic material may be applied to each side using a substantially similar coating technique to create magnetic layers on the different sides with the same easy axes. In some cases, for example, the same magnetic material and the same coating technique may be used for both sides of the tape. Using the same magnetic material for magnetic coatings of opposing sides of a two-sided tape can significantly reduce the manufacturing complexity for two-sided tape fabrication and may also reduce the cost associated with such two-sided tape manufacture.

Information is magnetically recorded on each side of the magnetic tape along tracks. Within the tracks, magnetic transitions comprise locations on the medium where the recorded magnetic signals change orientation. When the two-sided magnetic data storage tape is spooled, the first and second tracks contact each other on the tape spool. In accordance with the invention, the magnetic transition azimuth on the first side of the magnetic data storage tape is substantially different from the magnetic transition azimuth on the second side of the tape. Therefore, when the magnetic tape is spooled, the magnetic transitions interact in an incoherent manner. Importantly, the incoherent interaction reduces or eliminates the possibility for substantial demagnetization of the transitions. Accordingly, the amount of signal corruption may be reduced relative to two-sided tape that does not define different transition azimuths on the opposing sides.

In one embodiment, the invention is directed to a magnetic data storage tape comprising a first side including first magnetic material that defines a first easy axis of magnetic anisotropy and a first track including magnetic transitions that define a first azimuth, and a second side including second magnetic material that defines a second easy axis of magnetic anisotropy and a second track including magnetic transitions that define a second azimuth. The first and second easy axes are substantially similar and the first and second azimuths are substantially different.

In another embodiment, the invention is directed to a method for creating two-sided magnetic data storage tape. The two-sided data storage tape includes a first side with first magnetic material that defines a first easy axis of magnetic anisotropy, and a second side with second magnetic material that defines a second easy axis of magnetic anisotropy. A first track including magnetic transitions that define a first azimuth is recorded on the first side, and a second track including magnetic transitions that define a second azimuth is recorded on the second side. The first and second easy axes are substantially similar and the first and second azimuths are substantially different.

In another embodiment, the invention is directed to a system comprising a magnetic data storage tape including a first side with a first easy axis of magnetic anisotropy, and a second side with a second easy axis of magnetic anisotropy. A first recording head is positioned in proximity to the first side to record magnetic transitions in a first track on the first side. The first recording head defines a recording gap configured to define a first azimuth on the first side. A second recording head is positioned in proximity to the second side to record magnetic transitions in a second track on the second side. The second recording head defines a recording gap configured to define a second azimuth on the second side. The first and second easy axes are substantially similar and the first and second azimuths are substantially different.

The invention is capable of providing many advantages. Some conventional two-sided magnetic storage tapes provide different easy axes of magnetic anisotropy on opposing sides in order to reduce demagnetization effects. Media according to the invention, however, have easy axes of magnetic anisotropy on opposing sides that are substantially the same. This can significantly reduce manufacturing complexity and manufacturing costs. For example, in accordance with the invention, the same magnetic coatings may be used on both sides of the two sided tape. At the same time, the invention can reduce demagnetization effects caused by tape spooling by recording the magnetic transitions in the tracks on the different sides at different azimuths. In this manner, the invention balances the goal of simplified media manufacture with the goal of reducing or avoiding media degradation when the media is spooled.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
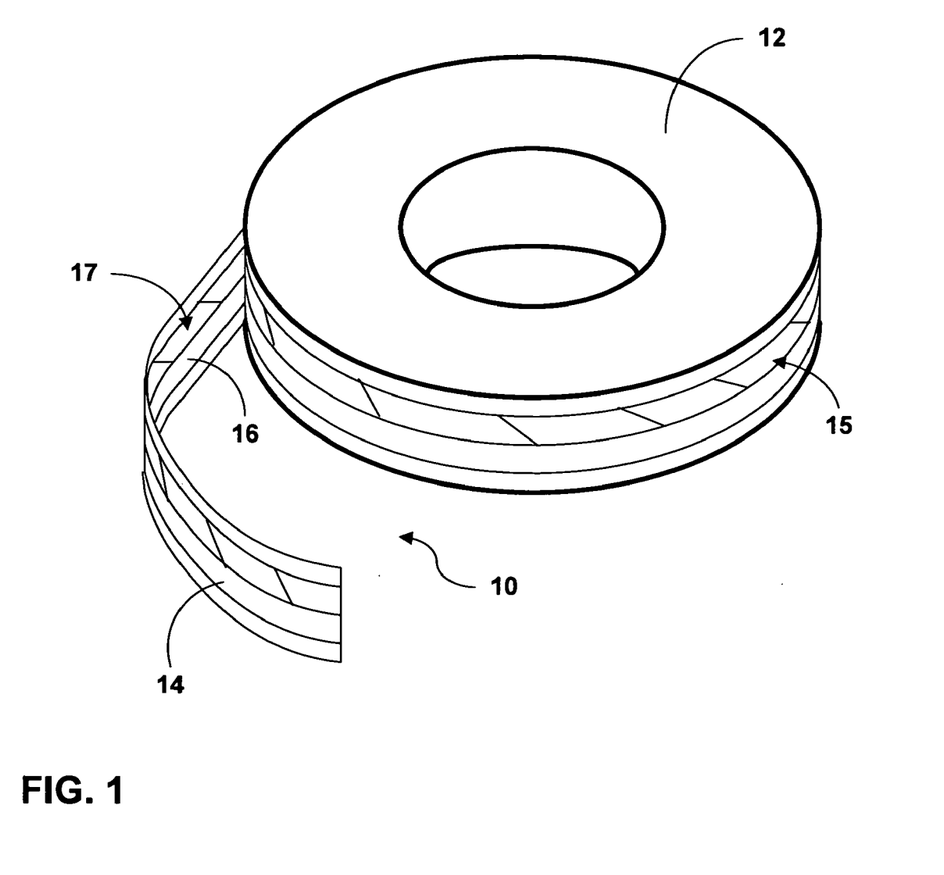
FIG. 1 is a schematic diagram illustrating a spool of magnetic data storage tape including a first side and a second side.

FIG. 1 is a schematic diagram illustrating a spool 12 of magnetic data storage tape 10 including a first side 14 and a second side 16. In accordance with the invention, magnetic tape 10 is a two-sided data storage tape. In this disclosure the phrase "two-sided data storage tape" refers to data storage tape that includes magnetically recordable material on both sides of the media. In that case, data can be magnetically recorded in data tracks on both sides 14, 16 in order to increase storage capacity. Servo information may also be recorded in servo tracks on first side 14, second side 16, or both sides, in order to facilitate tracking.

Magnetic tape 10 is created by applying first magnetic material to first side 14 and second magnetic material to second side 16. The first magnetic material defines a first easy axis of magnetic anisotropy for first side 14. The second magnetic material defines a second easy axis of magnetic anisotropy for second side 16.

The "easy axis of magnetic anisotropy" refers to the axis in the medium corresponding to the low energy magnetic orientation of the magnetic particles. In particular, the magnetic material may assume its low-energy state in any direction on the medium. In accordance with the invention, however, the easy axis of magnetic anisotropy is the same for first side 14 and second side 16. The first and second magnetic materials may comprise magnetic coatings, multi-layered magnetic stacks, magnetic alloys, and the like. One or more seed layers may also be used to improve growth of the subsequently deposited magnetic layers in order to help define the desired magnetic anisotropy. Various buffer layers, or the like, may also be used. In any case, the easy axis of magnetic anisotropy is the same for first side 14 and second side 16. For example, this may be achieved by using substantially the same magnetic material or stack, deposited on the opposing sides of tape 10 under substantially the same conditions. Applying the same magnetic material to both sides 14, 16 using substantially the same deposition technique makes magnetic tape 10 simple and inexpensive to manufacture. In that case, it is not necessary to modify the coating procedure for the different sides. Instead, the same procedure can be used to coat both sides with magnetic material.

Some conventional two-sided magnetic tape define different easy axes of magnetic anisotropy on each side of the tape. The differing easy axes may reduce demagnetization effects between the magnetic transitions recorded on each side of the tape. However, creating the different magnetic anisotropy on each side can complicate significantly the manufacture of the magnetic tape. For example, such conventional techniques may require different magnetic materials to be applied to each side of the tape in order to achieve the different easy axes. Alternatively, the different magnetic anisotropies of conventional two-sided media may be defined by applying substantially similar materials to the magnetic tape using different application techniques for each side. In either case, altering the material and/or application technique complicates the manufacturing process of the magnetic data storage tape and may increase manufacturing costs.

In order to simplify the manufacturing procedure, the current invention creates magnetic coatings on opposing sides that have the same easy axis of magnetic anisotropy. At the same time, the invention provides for reduced demagnetization effects caused by tape spooling by recording the magnetic transitions in the tracks on the different sides at different azimuths. In this manner, the invention balances the goal of simplified media manufacture with the goal of reducing or avoiding media degradation when the media is spooled.

As shown in FIG. 1, second side 16 lies proximate first side 14 when magnetic tape 10 is spooled. First side 14 includes a first track 15 and second side 16 includes a second track 17. The first track 15 and the second track 17 may comprise data tracks that include magnetically encoded transition regions in the media. When the tape 10 is spooled, demagnetization effects arise from the proximity of the magnetic transitions in first track 15 to the magnetic transitions in second track 17. Demagnetization may cause corruption and erasure of the data stored in the tracks.

However, the effects of demagnetization can be significantly reduced by ensuring that any magnetic interaction between the magnetic transitions in the tracks 15, 17 is substantially incoherent. In other words, the transitions in tracks 15, 17 do not align when the tape is spooled. In particular, the magnetic transitions in first track 15 define a first azimuth and the magnetic transitions in second track 17 define a second azimuth. The second azimuth is substantially different from the first azimuth. In some cases, the second azimuth is angularly displaced from the first azimuth when viewed from the first side. Accordingly, the magnetic transitions in first track 15 may cross the magnetic transitions in second track 17 when spooled (as shown in FIG. 1), but will never align in a coherent manner that might otherwise cause erasure or corruption of any full transition. Therefore, any magnetic interaction between the magnetic transitions of opposing sides is substantially incoherent, reducing the potential for demagnetization.

Figure 2:
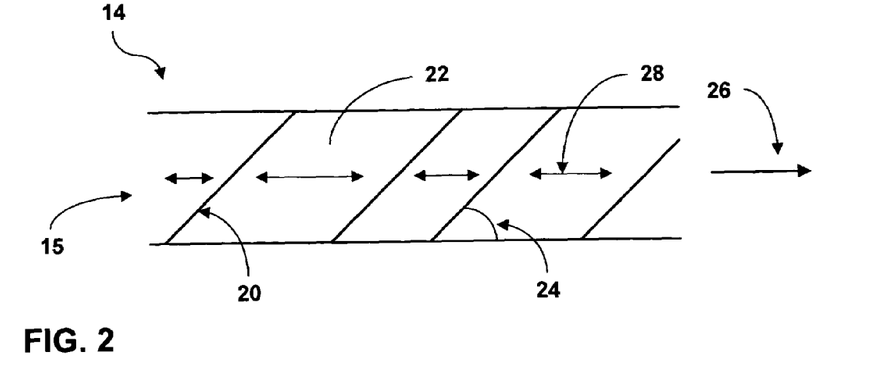
FIG. 2 is a schematic diagram illustrating an example azimuthal layout of magnetic transitions recorded in a first track on the first side of the magnetic data storage tape from FIG. 1.

FIG. 2 is a schematic diagram illustrating an example azimuthal layout of magnetic transitions 20 recorded in first track 15 on first side 14 of magnetic data storage tape 10 from FIG. 1. First magnetic material coats first side 14 to define a first easy axis of magnetic anisotropy 28. Magnetic transitions 20 are recorded in first track 15 at a first azimuth 24. Each transition 20 encodes data on the magnetic tape 10. Regions 22 separate the magnetic transitions 20 from each other. Within regions 22 the magnetization typically does not change. The magnetization changes, however, at transitions 20. Accordingly, transitions 20 can be detected for data readout. In this manner, data can be encoded on data storage tape 10 and read from tape 10. In the embodiment shown in FIG. 2, first azimuth 24 defines approximately a 45 degree angle to a down track direction 26 of first side 14. Other angles, however, may also be used.

Figure 3:
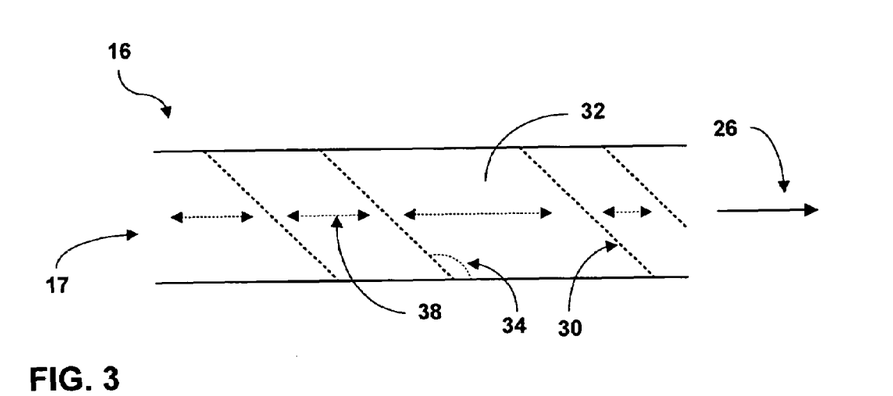
FIG. 3 is a schematic diagram illustrating an example azimuthal layout of magnetic transitions in a second track on the second side of the magnetic data storage tape from FIG. 1, as viewed from the first side.

In some embodiments (as illustrated), magnetic transitions 20 are not perpendicular to first track 15 in order to reduce the possibility of data corruption. In other embodiments, first azimuth 24 may comprise any range of angles relative to the angle 34 of second azimuth, as shown in FIG. 3. As long as the angles are substantially different, any magnetic interaction between the magnetic transitions on the first side and second side should be incoherent. Thus, the transitions on one side of tape 10 could be perpendicular to the tracks, but in that case, the transitions on the other side of tape 10 would need to be non-perpendicular to the tracks.

As described above, first side 14 includes first magnetic material that defines first easy axis of magnetic anisotropy 28. The magnetic anisotropy may be longitudinal and the first easy axis 28 may be substantially parallel to the surface of magnetic tape 10. In other embodiments, however, the magnetic anisotropy may be perpendicular and first easy axis 28 may be substantially perpendicular to the surface of magnetic tape 10. In other words, the techniques described herein may be useful for both longitudinal media in which the easy axis is parallel to the media surface, or perpendicular in which the easy axis is perpendicular to the media surface.

In accordance with another aspect of the invention, first easy axis 28 may be selected such that it is not perpendicular to first azimuth 24 defined by the magnetic transitions 20. Instead, first easy axis 28 is independent of magnetic transitions 20 and first azimuth 24. In that case, magnetic data storage tape 10 may be easier to fabricate than storage tapes that require a transition azimuth to be perpendicular to an easy axis of magnetic anisotropy.

Data is recorded in first track 15 on first side 14 as magnetic signals by a recording head. The recording head applies a magnetic field to first side 14 to record magnetic transitions 20 in first track 15. The recording head may be designed to write magnetic transitions 20 at first azimuth 24. In particular, a write gap of the head may be configured so that magnetic transitions 20 define first azimuth 24. Consequently, a read head may be designed to have a read gap that is similar to the write gap of the write head so that the read head can detect magnetic transitions 20 at first azimuth 24 and decode the stored information. In some embodiments, the recording head may be rotatable in order to define a plurality of azimuths.

FIG. 3 is a schematic diagram illustrating an example azimuthal layout of magnetic transitions 30 in second track 17 on second side 16 of magnetic data storage tape 10 from FIG. 1, as viewed from first side 14. Second magnetic material coats second side 16 to define a second easy axis of magnetic anisotropy 38. Magnetic transitions 30 are recorded in second track 17 on second side 16 at a second azimuth 34. Each transition 30 encodes data on the medium, similar to magnetic transitions 20 in first track 15. Regions 32 separate the magnetic transitions 30 from each other. Within regions 32 the magnetic signal typically does not change. Between transitions 30, however, the signal changes. In that manner, data can be encoded on second side 16 data storage tape 10.

In some embodiments, magnetic transitions 30 are not perpendicular to second track 17, in order to reduce the possibility of data corruption. In the embodiment shown in FIG. 3, second azimuth 34 comprises a 135 degree angle to down track direction 26 as viewed from first side 14. In other embodiments, second azimuth 34 may comprise other angles that are substantially different from first azimuth 24 with reference to down track direction 26 and first side 14. In that way, the magnetic transitions 20 and 30 in the first and second tracks only magnetically interact incoherently.

As described above, second side 16 includes second magnetic material that defines second easy axis of magnetic anisotropy 38. In accordance with the invention, second easy axis 38 is substantially similar to first easy axis 28. Therefore, second magnetic material may be substantially similar to first magnetic material, which reduces cost and complexity of the manufacture of magnetic tape 10. Both magnetic anisotropies may be longitudinal or perpendicular, and both easy axes may be substantially parallel or substantially perpendicular to a major axis of magnetic tape 10. Importantly, the anisotropies and easy axes are substantially the same on the opposing sides.

Again, in some cases, the easy axes 28, 38 are not perpendicular to first azimuth 24 or second azimuth 34. Instead, both easy axis 28 and 38 are independent of magnetic transitions 20 and first azimuth 24, and magnetic transitions 30 and second azimuth 34. As described with reference to FIG. 2, magnetic data storage tape 10 may be easier to fabricate if the transitions can have a range of azimuths not necessarily perpendicular to the easy axes of magnetic anisotropy.

Data is recorded in second track 17 on second side 16 by a recording head. The recording head applies a magnetic field across a write gap defined in the head to record the magnetic transitions 30 in second track 17. The write gap of the recording head may be designed to write magnetic transitions 30 at second azimuth 34. Consequently, a read head may be designed to read magnetic transitions 30 at second azimuth 34 in order to recover the stored information. For example, the read head may have magnetic gaps oriented the same as those of the recording head. In some embodiments, the recording head and/or read head may be rotatable in order to define a plurality of azimuths.

Figure 4:
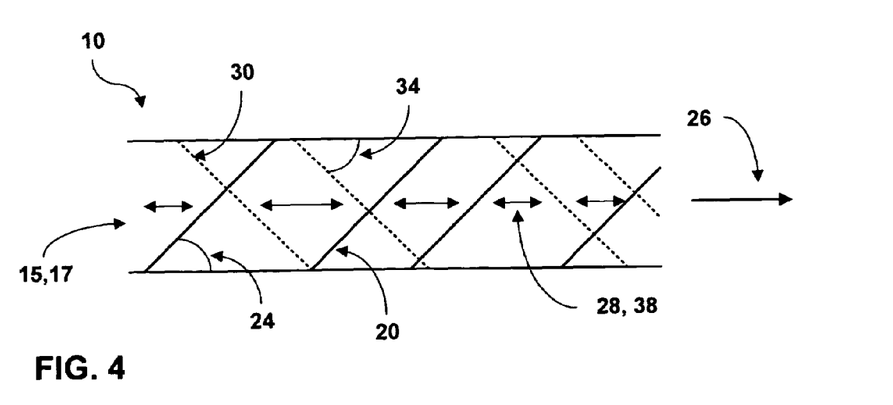
FIG. 4 is a schematic diagram illustrating the azimuthal layouts of the magnetic transitions on opposing sides of a magnetic data storage tape.

FIG. 4 is a schematic diagram illustrating the azimuthal layouts of magnetic transitions 20 in first track 15 from FIG. 2 and magnetic transitions 30 in second track 17 from FIG. 3, as viewed from first side 14. As shown in FIG. 4, first easy magnetization direction 28 is substantially similar to second easy magnetization direction 38. Also shown in FIG. 4, first azimuth 24 is substantially different from second azimuth 34 relative to down track direction 26 when viewed from first side 14. When the tape is spooled, magnetic transitions 20 and magnetic transitions 30 interact substantially incoherently such that transitions 20 in first track 15 are not completely corrupted by demagnetization effects from partially overlapping transitions 30 in second track 17 when the tape is spooled. For example, one of magnetic transitions 20 and one of magnetic transitions 30 may only interact at one region along the tracks 15, 17 when the tape is spooled.

As described above, first and second easy axes of magnetic anisotropy 28 and 38 are substantially similar. The first and second magnetic materials that coat first and second sides 14 and 16 to define the easy axes may be substantially similar in composition and be applied using substantially the same deposition techniques. Magnetic transitions 20 are recorded in first track 15 on first side 14 at first azimuth 24. Magnetic transitions 30 are recorded in second track 17 on second side 16 at second azimuth 34. Transitions 20, 30 comprise locations on the medium where the recorded magnetic signals change orientation. Magnetic transitions 20 and 30 are recorded by gaps in recording heads, which apply the magnetic signals to first track 15 and second track 17 on magnetic tape 10. The gaps in the recording heads are designed or positioned to define first and second azimuths 24 and 34, respectively.

In the illustrated embodiment, the first and second azimuths 24, 34 are equal, but opposite. In that case, the amount of overlap between the magnetic transitions 20 and 30 when spooled is limited to a small portion of each data track. In other embodiments, the azimuths 24 and 34 may comprise other substantially different angles to limit the contact between transitions 20 and 30. In either case, the magnetic fields attributed to magnetic transitions 20 and magnetic transitions 30 magnetically interact substantially incoherently when magnetic tape 10 is spooled. The incoherent interaction substantially avoids demagnetization of the transitions and reduces the amount of signal corruption that occurs as a result of tape spooling.

In the embodiment where the first azimuth and the second azimuth comprise equal but opposite angles with reference to the down track direction of the first side, the first recording head and the second recording head may be designed to record at substantially similar azimuths. However, the similar recording heads may be placed opposite one another in a recording system to record on the first side and the second side, respectively, of the magnetic data storage tape. The arrangement of the first and second recording heads causes the first and second azimuths to appear angularly displaced from one another when viewed from the first side. However, the azimuthal angles are actually substantially similar when viewed from the respective sides of the tape.

Importantly, the magnetic transitions in the data tracks of opposing sides do not align when the tape is spooled. Instead, when the tape is spooled, the magnetic transitions may only cross one another at a single point, avoiding substantial signal degradation of any full transition region. Any slight signal degradation along a point of a track may be compensated for by signal decoding components. The demagnetization between the magnetic transitions recorded at first azimuth 24 and second azimuth 34 may corrupt or erase some of the stored magnetic signals, but the data remains recoverable. In other words, the orientation of the magnetic transitions does not allow a large enough portion of the stored signal to be corrupted to completely lose the data.

In another embodiment, the tracks may comprise servo tracks including time based magnetic servo marks. In that case, the time based servo marks on a first side may assume a different angle relative to one another than time based servo marks on the opposing side.

Time-based servo techniques are particularly effective for magnetic tape, which typically feeds past transducer heads at a constant velocity. For example, N-shaped servo markings, servo markings such as "<<< >>>" or "//// \\\\," or the like, have been developed for time based servo techniques. Such markings are typically formed in a servo track of the magnetic tape.

When time-based servo techniques are used, the time offset between detection of two or more servo marks can be translated into a position error signal, which defines a lateral distance of the transducer head relative to a data track. For example, given a constant velocity of magnetic tape formed with marking "/ \", the time between detection of "/" and "\" becomes larger when the servo head is positioned towards the bottom of marking "/ \" and smaller if the servo head is positioned towards the top of marking "/ \". Given a constant velocity of magnetic tape, a defined time period between detected servo signals may correspond to a center of marking "/ \". By locating the center of marking "/ \", a known distance between the center of the servo track and the data tracks can be identified.

In order to avoid signal corruption when the tape is spooled, as described herein, the marking, such as "/ \" on a first side may define different angles or arrangements than a marking, such as "\ /" on a second side. In this manner, time base servo marks recorded on both sides of a two sided medium may avoid corruption when the tape is spooled. In that case, however, the servo system would need to know which side had which markings so that proper servo movement can be identified.

Figure 5:
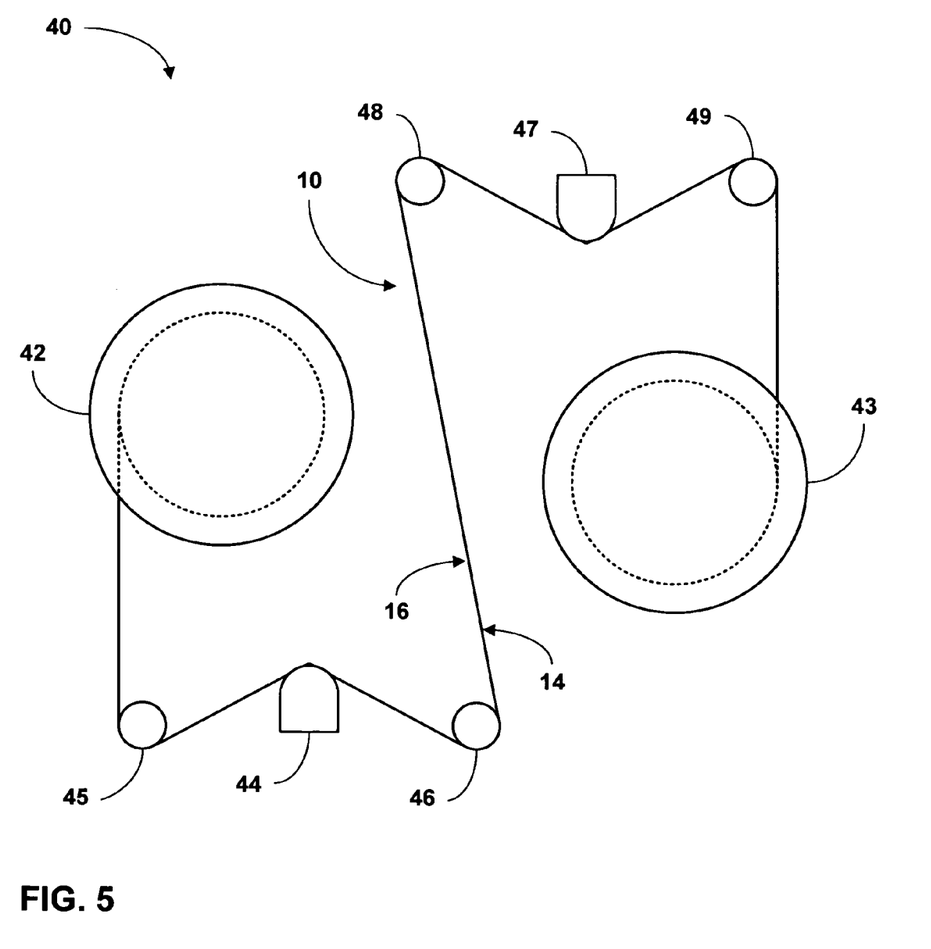
FIG. 5 is a schematic diagram illustrating an exemplary system for recording data to both sides of a magnetic data storage tape in a single pass.

FIG. 5 is a schematic diagram illustrating an exemplary system 40 for recording data to both sides 14, 16 of magnetic data storage tape 10 from FIG. 1 on a single pass, according to an embodiment of the invention. System 40 includes first spool 42, second spool 43, first recording head 44, second recording head 47, and guides 45, 46, 48, and 49. Guides 45, 46, 48, and 49 comprise a mechanical arrangement that defines a tape path through system 40. The tape path leads magnetic tape 10 from first spool 42, past first recording head 44 and second recording head 47, to second spool 43 to record data to both sides 14, 16 in one pass. One or both of spools 42, 43 may be included within a tape cartridge or a similar enclosed structure.

In order to record data on first and second sides 14 and 16, magnetic tape 10 is unspooled from first spool 42. Guides 45 and 46 pass first side 14 proximate first recording head 44. First recording head 44 applies magnetic signals to first side 14 by generating a magnetic signal across a write gap to store the signals in first track 15. The orientation of the write gap of head 46 creates magnetic transition regions 20, which define first azimuth 24. Guides 48 and 49 pass second side 16 of magnetic tape 10 proximate second recording head 47. Second recording head 47 applies magnetic signals to second side 16 by generating a magnetic signal across a write gap to store the signals in second track 17. The orientation of the write gap of head 47 creates magnetic transition regions 30, which define second azimuth 34.

Once first and second sides 14 and 16 are recorded, magnetic tape 10 is respooled to second spool 43. Magnetic transitions 20 and magnetic transitions 30 define azimuths 24, 34 that are substantially different, such that demagnetization between the two sides 14, 16 is substantially avoided when magnetic tape 10 is respooled on second spool 43. Second azimuth 34 may be angularly displaced from first azimuth 24 when viewed from first side 14. This allows magnetic interaction between magnetic transitions 20 and magnetic transitions 30 to be substantially incoherent.

First recording head 44 and second recording head 47 may comprise write heads. Again, the gaps of recording heads 44 and 47 may be designed to record the signals at first azimuth 24 and second azimuth 34 respectively. In some embodiments, first recording head 44 and second recording head 47 may rotate so that gaps can be selectively positioned to define the transition azimuths.

In most cases, however, recording heads 44 and 47 may generally comprise stationary heads that write or erase signals in order to create data in first track 15 and second track 17 on sides 14, 16 respectively of magnetic data storage tape 10. Conventional recording head drivers may control recording heads 44, 47 to generate the desired magnetic fields across the respective gaps. If used for servo recording, the same recording driver may be used to drive both recording heads 44, 47. In that case, recording heads 44, 47 may share a common recording current source, which can simplify system 40.

In some embodiments, first azimuth 24 on first side 14 is equal, but opposite to second azimuth 34 on second side 16. In that embodiment, first recording head 44 and second recording head 47 may be substantially similar recording heads that are positioned to record the data at opposite azimuths. As shown in FIG. 5, first recording head 44 faces an opposite direction than second recording head 47. Therefore, in the embodiment illustrated in FIG. 5, recording heads 44 and 47 may include substantially similar design, but due to the orientation of the recording heads 44, 47 within system 40, the transition regions 20, 30 are recorded at equal, but opposite azimuths. In other embodiments, recording heads 44 and 47 may record at other azimuths, as long as the azimuths are different enough to ensure that transitions will not coherently magnetically interact when the tape is spooled.

System 40 shows an exemplary implementation that may write to both sides 14, 16 of magnetic tape 10 in a single pass, i.e., a single unwinding and re-winding of magnetic tape 10 from first spool 42 to second spool 43. Other mechanical arrangements of guides 45, 46, 48, 49 and recording heads 44, 47, however, may also allow for writing to both sides of magnetic data storage tape 10. By facilitating the writing of signals to record data on both sides 14, 16 of magnetic tape 10 in a single pass, the writing of data to both sides of two-sided magnetic data storage tape can be accelerated.

In another embodiment, a system may write data to both sides 14, 16 of magnetic tape 10 with only one recording head. In that case, magnetic tape 10 is unspooled from a first spool and first side 14 is passed proximate the recording head. The recording head writes data in first track 15 at first azimuth 24. Magnetic tape 10 is then respooled on a second spool. In order to record on second side 16 of magnetic tape 10, the entire second spool flips upside down. Magnetic tape 10 is unspooled from the second spool and the second side is passed proximate the recording head. The recording head writes data in second track 17 at second azimuth 34. Magnetic tape 10 is then respooled on the first spool. In that case, first azimuth 24 is equal, but opposite second azimuth 34. The recording head maintains the same azimuth when recording to both sides 14, 16, but flipping the second spool prior to recording on second side 16, causes the first azimuth 24 to be opposite the second azimuth 34 when viewed from first side 14.

Figure 6:
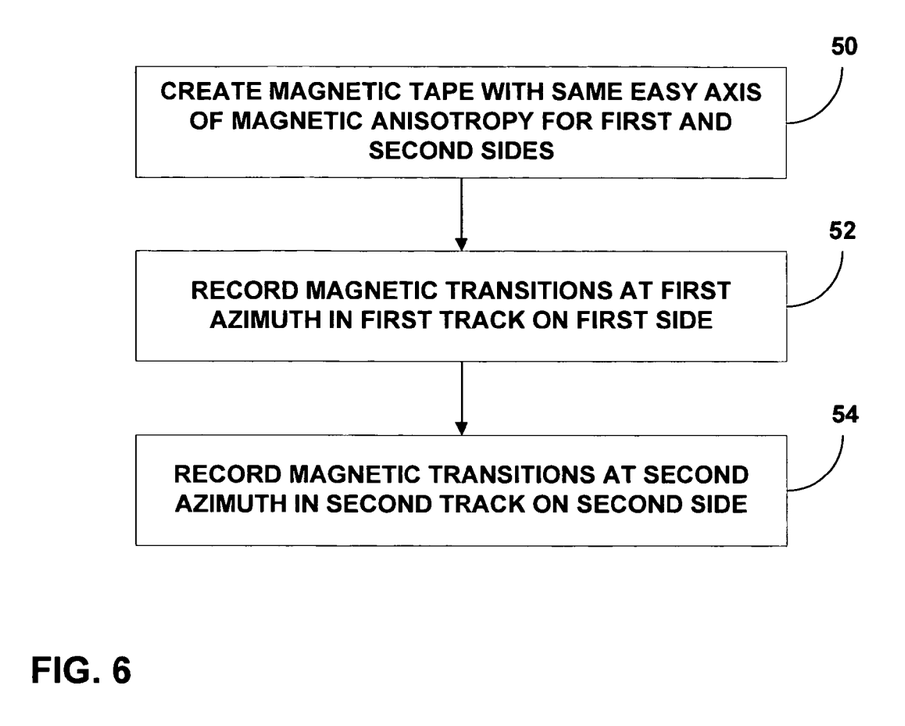
FIG. 6 is a flow diagram illustrating a method of storing data on two-sided magnetic data storage tape.

FIG. 6 is a flow diagram illustrating a method of storing data on two-sided magnetic data storage tape 10 from FIG. 1. Magnetic tape 10 is created with the same easy axis of magnetic anisotropy 28, 38 for first side 14 and second side 16 (50). In particular, the same coating material and coating techniques may be used for both sides. Any of a wide variety of conventional magnetic alloys, or stacks may be used.

Moreover, any of a wide variety of conventional coating techniques may be used. Importantly, however, the same materials and coatings may be used for both sides since the magnetic anisotropy does not need to differ on the opposing sides. Accordingly, magnetic tape 10 includes first side 14 with first magnetic material that defines first easy axis of magnetic anisotropy 28, and second side 16 with second magnetic material that defines second easy axis of magnetic anisotropy 38 which is substantially similar to first easy axis 28. Magnetic transitions 20 are recorded at first azimuth 24 in first track 15 on first side 14 (52). Magnetic transitions 30 are recorded at second azimuth 34 in second track 17 on second side 16 (54). First azimuth 24 is substantially different than second azimuth 34. Moreover, in some cases, first azimuth 24 is angularly displaced from second azimuth 34 when viewed from first side 14.

The storage method described above provides a simple and inexpensive solution to reducing demagnetization effects and signal corruption on two-sided magnetic storage tape. Using the same magnetic material on both first side 14 and second side 16 reduces the cost and complexity of manufacturing magnetic tape 10. Still, substantial demagnetization caused by tape spooling can be avoided by recording the magnetic transition regions 20, 30 in first and second tracks 15, 17 at azimuths 24, 34, respectively. Transitions 20, 30 may be recorded at azimuths 24, 34 by recording heads 44, 47 (FIG. 5). The recording heads 44, 47 may be easily designed with gaps to define the desired azimuths 24, 34. The differing azimuths 24, 34 ensure that magnetic transitions 20 and magnetic transitions 30 will magnetically interact substantially incoherently when magnetic tape 10 is spooled and first side 14 is proximate second side 16.

Figure 7:
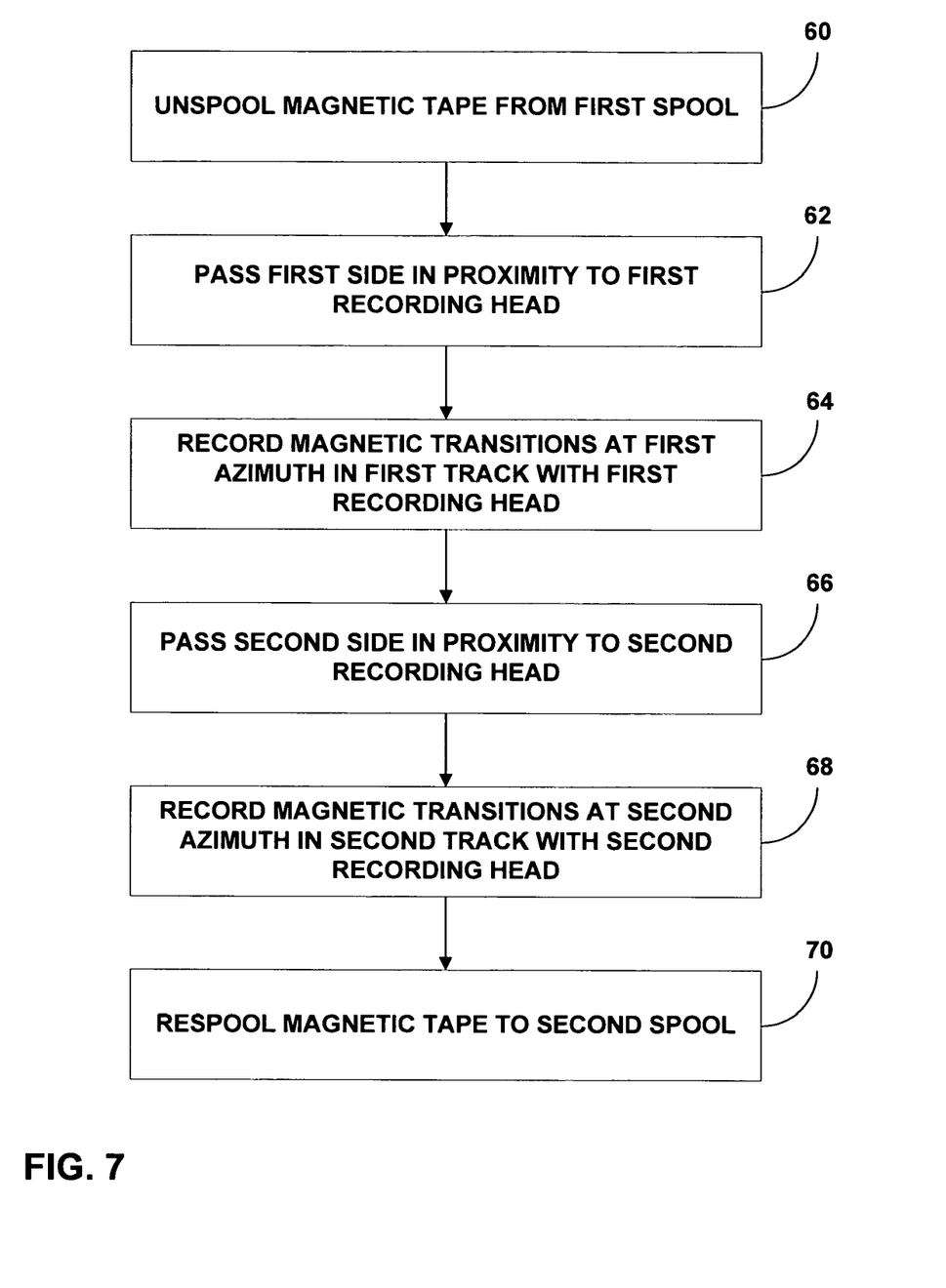
FIG. 7 is a flow diagram illustrating a method of using the recording system illustrated in FIG. 5 to record magnetic transitions in the tracks on both the first and second sides of a magnetic data storage tape.

FIG. 7 is a flow diagram illustrating a method of using recording system 40 from FIG. 5 to record magnetic transitions 20, 30 in the data tracks 15, 17 on first and second sides 14 and 16 of magnetic data storage tape 10 from FIG. 1. Magnetic data storage tape 10 is unspooled from first spool 42 (60). Guides 45 and 46 pass first side 14 in proximity to first recording head 44 (62). First recording head 44 is designed or positioned to define first azimuth 24. First recording head 44 records magnetic transitions 20 at first azimuth 24 in first track 15 (64) on first side 14. Guides 48 and 49 pass second side 16 in proximity to second recording head 47 (66). Second recording head 47 is designed or positioned to define second azimuth 34. Second recording head 47 records magnetic transitions 30 at second azimuth 34 in second track 17 (68) on second side 16. Magnetic tape 10 is then respooled to second spool 43 (70). Once magnetic tape 10 is respooled to second spool 43, the magnetic transitions 20 recorded in first track 15 on first side 14 magnetically interact substantially incoherently with the magnetic transitions 30 recorded in second track 17 on second side 16.

First recording head 44 and second recording head 47 may record the magnetic signals on first side 14 and second side 16, respectively, during a single pass from first spool 42 to second spool 43. In that case, recording heads 44 and 47 may be oriented at locations slightly displaced from one another along the tape path defined by guides 45, 46, 48, and 49, as shown in FIG. 5. In other embodiments, the first side 14 and the second side 16 may be recorded during separate passes between first spool 42 and second spool 43.

Various embodiments of the invention have been described. For example, a method of storing data in tracks with magnetic transition regions oriented at different azimuths on each side of a two-sided magnetic data storage tape has been described. In accordance with the invention, the azimuths ensure substantially incoherent magnetic interaction between magnetic signals stored on a first side of the magnetic data storage tape and magnetic signals stored on a second side of the magnetic data storage tape when the tape is spooled. In addition, the media allows for simplified manufacture because the easy axes of magnetic anisotropy is not required to differ on opposing sides of the tape.

Nevertheless various modifications may be made. For example, although many of the techniques have been described in the context of creating magnetic transition regions for data encoding, similar techniques may be used for creating servo marks such as time-based servo marks that differ on opposing sides. Moreover, many aspects of the invention have been described in the context of longitudinal media for which the magnetic orientation of individual magnetic domains is generally parallel to the surface of the medium. However, the invention may also be applicable to perpendicular media for which magnetic anisotropy is perpendicular to the plane of the medium. These and other embodiments are within the scope of the following claims.

What is claimed is:

1. A magnetic data storage tape comprising:
    a first side including first magnetic material that defines a first easy axis of magnetic anisotropy and a first track including magnetic transitions that define a first azimuth; and
    a second side including second magnetic material that defines a second easy axis of magnetic anisotropy and a second track including magnetic transitions that define a second azimuth, wherein the first and second easy axes are substantially similar and the first and second azimuths are substantially different.

2. The magnetic data storage tape of claim 1, wherein the second azimuth is angularly displaced from the first azimuth when viewed from the first side.

3. The magnetic data storage tape of claim 1, further comprising a first set of tracks each including magnetic transitions at the first azimuth and a second set of tracks each including magnetic transitions at the second azimuth.

4. The magnetic data storage tape of claim 1, wherein the first track on the first side lies proximate the second track on the second side when the tape is spooled, and the magnetic transitions in the first track magnetically interact substantially incoherently with the magnetic transitions in the second track.

5. The magnetic data storage tape of claim 4, wherein the magnetic interaction between the magnetic transitions in the first track and the magnetic transitions in the second track when the tape is spooled does not cause substantial demagnetization of any of the magnetic transitions in the first or second tracks.

6. The magnetic data storage tape of claim 1, wherein the first azimuth comprises approximately a 45 degree angle to a down track direction of the first side, and the second azimuth comprises approximately a 135 degree angle to the down track direction of the first side.

7. The magnetic data storage tape of claim 1, wherein the magnetic anisotropy of the first and second sides is longitudinal, and wherein the first easy axis and the second easy axis are substantially parallel to a surface of the magnetic tape.

8. The magnetic data storage tape of claim 1, wherein the magnetic anisotropy of the first and second sides is perpendicular, and wherein the first easy axis and the second easy axis are substantially perpendicular to a surface of the magnetic tape.

9. The magnetic data storage tape of claim 1, wherein the first easy axis is not perpendicular to the first azimuth defined by the magnetic transitions in the first track, and the second easy axis is not perpendicular to the second azimuth defined by the magnetic transitions in the second track.

10. The magnetic data storage tape of claim 1, wherein the magnetic transitions comprise locations on the magnetic data storage tape where a recorded magnetic signal changes orientation.

11. The magnetic data storage tape of claim 1, wherein the magnetic transitions are not perpendicular to the first and second tracks.

12. A method comprising:
    creating a magnetic data storage tape that includes a first side with first magnetic material that defines a first easy axis of magnetic anisotropy and a second side with second magnetic material that defines a second easy axis of magnetic anisotropy;
    recording magnetic transitions that define a first azimuth in a first track on the first side; and
    recording magnetic transitions that define a second azimuth in a second track on the second side, wherein the first and second easy axes are substantially similar and the first and second azimuths are substantially different.

13. The method of claim 12, wherein the second azimuth is angularly displaced from the first azimuth when viewed from the first side.

14. The method of claim 12, further comprising:
    recording the magnetic transitions at the first azimuth in the first track on the first side of the magnetic data storage tape with a first recording head configured to define the first azimuth, and
    recording the magnetic transitions at the second azimuth in the second track on the second side of the magnetic data storage tape with a second recording head configured to define the second azimuth.

15. The method of claim 14, wherein defining the first azimuth comprises configuring the first recording head such that a gap in the first recording head defines approximately a 45 degree angle to a down track direction of the first side and defining the second azimuth comprises configuring the second recording head such that a gap in the second recording head defines approximately at a 135 degree angle to the down track direction of the first side.

16. The method of claim 12, further comprising spooling the magnetic data storage tape, wherein the first track on the first side lies proximate the second track on the second side and the magnetic transitions in the first track magnetically interact substantially incoherently with the magnetic transitions in the second track.

17. The method of claim 16, wherein the magnetic interaction between the magnetic transitions in the first track and the magnetic transitions in the second track when the tape is spooled does not cause substantial demagnetization of any of the magnetic transitions in the first or second tracks.

18. The method of claim 12, further comprising:
    un-spooling the magnetic data storage tape from a first spool;
    passing the first side of the magnetic data storage tape in proximity to a first recording head oriented to record the magnetic transitions at the first azimuth in the first track;
    passing the second side of the magnetic data storage tape in proximity to a second recording head oriented to record the magnetic transitions at the second azimuth in the second track; and re-spooling the magnetic data storage tape to a second spool.

19. A system comprising:

a magnetic data storage tape including a first side with a first easy axis of magnetic anisotropy, and a second side with a second easy axis of magnetic anisotropy;

a first recording head positioned in proximity to the first side to record magnetic transitions in a first track on the first side, and including a first gap to define a first azimuth on the first side; and a second recording head positioned in proximity to the second side to record magnetic transitions in a second track on the second side, and including a second gap to define a second azimuth on the second side, wherein the first and second easy axes are substantially similar and the first and second azimuths are substantially different when viewed from the first side.

20. The system of claim 19, wherein the second azimuth is angularly displaced from the first azimuth when viewed from the first side.

21. The system of claim 19, wherein the magnetic data storage tape is spooled and the first track on the first side lies proximate the second track on the second side and the magnetic transitions in the first track magnetically interact substantially incoherently with the magnetic transitions in the second track.

22. The system of claim 21, wherein the magnetic interaction between the magnetic transitions in the first track and the magnetic transitions in the second track when the tape is spooled does not cause substantial demagnetization of any of the magnetic transitions in the first or second tracks.

23. The system of claim 19, wherein the first recording head is configured such that the first gap defines approximately a 45 degree angle to a down track direction of the first side to define the first azimuth, and the second recording head is configured such that the second gap defines approximately a 135 degree angle to the down track direction of the first side to define the second azimuth.

24. The system of claim 19, wherein the first easy axis is not perpendicular to the first azimuth defined by the first set of tracks, and the second easy axis is not perpendicular to the second azimuth defined by the second set of tracks.

25. The system of claim 19, wherein the magnetic transitions are not perpendicular to the first and second tracks.

* * * * *